March 19, 1946. D. G. C. HARE ET AL 2,397,075
RADIATION DETECTOR
Filed Oct. 16, 1941
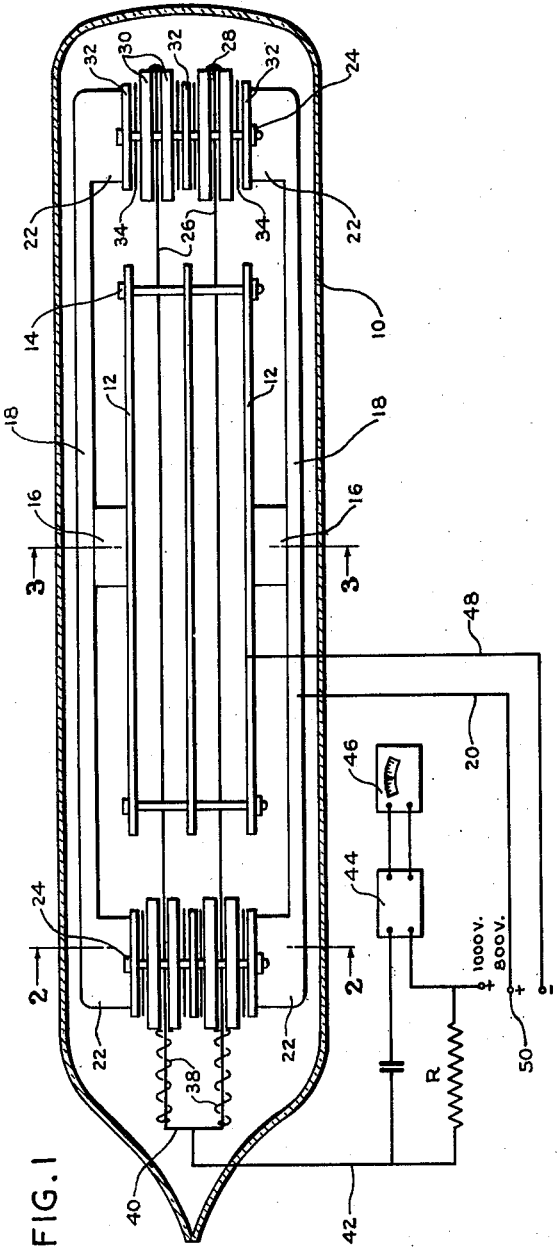
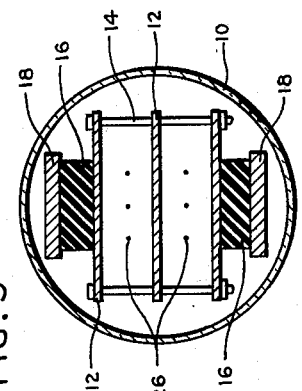
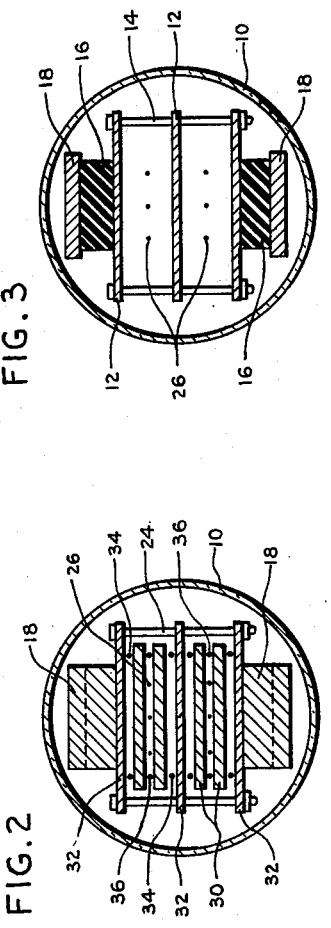
INVENTOR
D.G.C. HARE
GERHARD HERZOG
BY
HIS ATTORNEY Patented Mar. 19, 1946

2,397,075

UNITED STATES PATENT OFFICE 2,397,075

RADIATION DETECTOR

Donald G. C. Hare and Gerhard Herzog, Houston, Tex., assignors, by mesne assignments, to The Texas Company, New York, N. Y., a corporation of Delaware Application October 16, 1941, Serial No. 415,195

7 Claims. (Cl. 250—83.6)

This invention relates to the detecting and measurement of penetrative radiation, and more particularly to a device of the Geiger-Muller counter type for measuring the intensity of such radiation as gamma rays.

The principal object of the invention is to provide a device of this type which will have an efficiency much higher than the ordinary or conventional Geiger-Muller counter, which will be rugged and stable in operation so that it may be used in rough service such as, for instance, the logging of wells or bore holes and which will have a minimum of background noise caused, for instance, by electrical leakage between the elements of the device.

In making intensity measurements of such radiation as gamma rays, it is frequently desirable or necessary to use a detecting device of the Geiger-Muller counter type. The common Geiger-Muller counter usually comprises a cylinder of metal forming the cathode, sealed within a glass envelope and through the center of which cylinder is disposed a wire forming the anode. The envelope contains a suitable gas such as argon at a fairly low pressure of from 5 to 10 cms. of mercury, and the anode wire is maintained at a positive potential with respect to the cylinder. Normally the potential difference between the cathode and the anode is nearly but not quite high enough to cause a discharge to take place. If a particle capable of ionizing the gas passes through the cathode cylinder ionization of the gas will take place and a discharge will occur. The anode and cathode may be connected to a suitable amplifier and a recording instrument capable of registering the discharge of the counter. This type of counter is useful in many instances but in common with nearly all devices for detecting the presence of gamma rays it has a very low efficiency. An increase in this efficiency is very desirable, since for a given intensity of radiation the time necessary to obtain a measurement to a desired accuracy will vary directly with the efficiency.

In our co-pending patent application filed November 2, 1940, Serial No. 364,020, there is disclosed a device for detecting penetrative radiation, such as gamma rays, which device has an efficiency many times that of the devices known to the prior art. The device disclosed in that application is formed of two or more elongated parallel metal plates connected together electrically to form a cathode and separated in position so as to form a relatively small space. In this space are disposed a plurality of fine wires stretched parallel to the cathode plates and forming the anode of the device. The anode wires positioned in this manner provide the proper type of concentration or inhomogeneity of the field. Counters of this type have been constructed and found to be very satisfactory, having an efficiency many times that of the common Geiger-Muller counter. It is not uncommon, however, that during the operation of a particular radiation detector of this type spurious counts will be observed, these counts being caused by electrical leakage between the anode and cathode.

The present invention relates to a radiation detector of the general type disclosed in the aforementioned co-pending application having the advantage of high efficiency and also the advantage of reliability of operation. It is the particular purpose of this invention to provide such a device in which the "background effect" which may be caused by electrical leakage between the anode and cathode will be reduced to a minimum.

In accordance with the present invention, a radiation detecting device is formed of a plurality of thin metal plates disposed in separated parallel relation and connected together electrically to form a cathode. A plurality of fine wires are disposed in the spaces between the cathode plates in such a manner that they are substantially parallel to each other and to the plates. A metal support serves to maintain the plates and the wires in position and blocks and plates of electrically insulating material are disposed between the support and the anode wires. These elements are contained within a housing or envelope which may be of glass or a suitable metal and the housing, of course, is filled with a suitable gas such as argon under a predetermined pressure. The anode wires are connected to a source of positive electrical potential and the cathode is grounded or connected to the negative of the electrical source. The metal support within the housing is connected to an intermediate potential which may be of, say, 500 to 800 volts and in this manner leakage across the insulators is minimized. As an additional feature, small metal separator members such as short lengths of wire are placed between the insulating plates and the metal support so as to cut down the area of contact between these members.

For a better understanding of the invention reference may be had to the accompanying drawing in which:

Fig. 1 is an elevation through a detector embodying the invention, the electrical connections being shown diagrammatically;

Fig. 2 is a cross-section taken on the line 2—2 of Fig. 1, and

Fig. 3 is a cross-section on the line 3—3 of Fig. 1.

Referring to the drawing, a housing or envelope 10, shown as a glass tube is adapted to enclose the elements of the detecting device. A plurality of thin metal plates 12 are mounted in parallel spaced relation as by means of bolts 14, these bolts serving to connect the plates together electrically to form the cathode of the device. Suitable insulating blocks 16 position the cathode bank between a pair of metal supports 18 and a lead wire 20 extends from the cathode to a ground connection or to the negative of a source of electrical potential.

The supporting members 18 are provided with lateral extensions 22 at their ends and the spacing and insulating means for the anode wires are clamped between these extensions by means of suitable bolts 24. The anode for the device comprises a plurality of fine wires 26 extending longitudinally through the spaces between the cathode plates 12 and in substantially parallel relation to the plates. One end of each of the wires 26 may be provided with an enlargement such, for instance, as a drop of solder 28 and these ends of the wires are then placed between parallel insulating plates 30 which are clamped between the ends 22 of the supports 18. A pair of metal plates 32 may be attached to, or form a part of, the ends 22 of the supporting members and these plates 32 are positioned so as to be opposite, or rather, in alignment with the outermost cathode plates 12. Another of the metal plates 32 is preferably placed opposite the center cathode plate 12 and between the insulating plates 30 which serve to support the anode wires 26. In order to reduce the area of contact between the insulating plates 30 and the metal plates 32, small pieces of metal approximately .015 inch thick or, if preferred, two small pieces of nickel wire 34, .010 inch thick are preferably placed between the glass insulating plates 30 and the metal plates 32, as shown more clearly in Fig. 2. As the area of contact between the glass insulating plates and the metal plates is decreased, the electrical leakage decreases and the efficiency of the counter is improved due to the lessening of the back-ground effect. In order to maintain the pairs of glass plates 30 slightly separated so that the anode wires 26 can pass freely between them, another pair of short lengths of wire 36 slightly thicker than the anode wires, are placed between the edges of the pairs of glass plates, as shown in Fig. 2.

Although three of the wires 26 are shown as extending between each pair of cathode plates 12, it is obvious that more or less of these wires can be used, depending on such factors as the size of the unit. Likewise, although but three cathode plates 12 are illustrated, this is mainly for purposes of clarity and it is understood that a larger number of plates will usually be utilized, this number depending upon the efficiency desired, the size of the unit, etc. For each pair of cathode plates there will, of course, be another set of the anode wires 26 maintained in position by means of additional insulating plates 30. In order to maintain the wires 26 taut, a small compression spring 38 may be disposed so as to surround the end of each wire as it projects from the glass plates 30 and arranged so that the spring will normally be under a predetermined compression so as to place a tension in the wire. The anode wires 26 are connected together electrically as indicated at 40 in Fig. 1, and a lead 42 extends outwardly of the housing 10 to a resistance R and to a suitable amplifier 44. The other end of the resistance R is connected to a source of positive potential such as 1,000 volts and also to the amplifier 44. A suitable indicating device or recorder 46 connected to the output of the amplifier 44 serves to indicate or record the counts or discharges of the detector, which cause voltage drops across the resistance R.

It has been found that even with the provision of the separator wires 34 between the glass plates 30 and the metal of the cathode or the supports 18, spurious counts may sometimes occur due to electrical leakage across the insulators. In order to eliminate this, the center or intermediate metal plates 32 are connected electrically by means of the bolts 24 to the supports 18, and the supports are connected electrically by means of lead 48 either to the ground to leak off any discharge across the surface of the insulators or to an intermediate potential such as is indicated at 50. Although this intermediate potential is indicated as 800 volts, it is understood that any medium voltage applied to the metal supports 18 will tend to eliminate leakage across the insulators. It is understood that the housing 10 will be filled with a suitable gas such as Argon under a predetermined pressure. The lead wires 20, 42 and 48 will, of course, be sealed in the housing or envelope 10 so that the latter can be maintained airtight. A gamma ray entering the detector and striking one or more of the cathode plates 12 may interact with an atom of the metal of which the plate is formed and cause an electron to be ejected into the gas within the device. This will cause ionization of the gas and a discharge or count will occur and will be indicated or recorded by means of the instrument 46.

It is understood that the elements shown in the drawing may not be illustrated in size exactly as they are constructed. The cathode plates 12 and the metal plates 32 are usually about 0.2 to 1 mm. in thickness and the spaces between the pairs of cathode plates may be as little as ⅛ of an inch or less in thickness. The glass plates 30 will, of course, be correspondingly thinner than they have been shown for purposes of simplification in the drawing. Any suitable number of the insulating blocks 16 may be used to support the cathode from the members 18 and the entire device may, of course, be made in any length desired, limited only by the strength of the various elements used. The use of a guard plate embodying the principles of this invention in connection with a somewhat similar type of radiation detector is disclosed in the copending application of Donald G. C. Hare, Serial No. 415,194, filed concurrently with this application.

Obviously many modifications and variations of the invention, as hereinbefore set forth, may be made without departing from the spirit and scope thereof and, therefore, only such limitations should be imposed as are indicated in the appended claims.

I claim:

1. In a detector of penetrative radiation in which a cathode and an anode are disposed in a gas filled housing and connected to a source of high electrical potential, means for minimizing leakage between said cathode and anode comprising electrical insulators between said cathode and said anode, a metallic member adapted to support said insulators thereby supporting said cathode and said anode, and means for connecting said supporting member to a source of potential intermediate that to which said cathode and said anode are concerned.

2. A radiation detector comprising a housing, a bank of separated parallel plates in said housing connected together electrically to form a cathode, a plurality of wires extending through the spaces between said plates and connected together electrically to form an anode, a support for said cathode bank and said anode wires, insulation between said support and said bank and between said support and said wires, means for applying a high potential across said wires and said cathode bank and means for minimizing electrical leakage across said insulating means comprising an intermediate potential connected to said support.

3. In a detector of penetrative radiation in which a cathode and an anode are disposed in a gas filled housing and connected to a source of electrical potential, means for minimizing leakage between said cathode and anode comprising electrical insulators between said cathode and said anode, a metallic member adapted to support said insulators thereby supporting said cathode and said anode, a plurality of contact members separating a portion of said insulators from said metallic member to minimize the area of contact between said insulators and said metallic member, and means for connecting said supporting member to a source of potential intermediate that to which said cathode and said anode are connected.

4. A detector of gamma radiation comprising a housing, an elongated metallic supporting member within said housing, a plurality of plates disposed in parallel, separated relation and connected together electrically to form a cathode, a plurality of anode wires stretched parallel to and through the spaces between said plates, insulating supporting means between said supporting member and said cathode plates and between said supporting member and said wires, means for connecting said wires to a source of high potential, means for grounding said cathode plates, and means for connecting said supporting member to an intermediate potential.

5. A radiation detector comprising a bank of parallel separated plates connected together to form a cathode, a plurality of wires extending longitudinally through the spaces between said plates and connected together to form an anode, insulating spacer members between said anode and said cathode, means for applying an electrical potential across said anode and said cathode, and means for minimizing leakage across said insulating members comprising metallic plates disposed between adjacent spacer members, said metallic plates being connected to a source of electrical potential intermediate that applied to said anode and cathode.

6. A radiation detector comprising a bank of parallel separated plates connected together to form a cathode, a plurality of wires extending longitudinally through the spaces between said plates and connected together to form an anode, insulating spacer members between said anode and said cathode, means for applying an electrical potential across said anode and said cathode, and means for minimizing leakage across said insulating members comprising metallic plates disposed between adjacent spacer members and a plurality of short lengths of wire disposed between and in contact with said spacer members and said metallic plates, said metallic plates being connected to a source of positive electrical potential lower than that applied to said anode.

7. A radiation detector comprising a housing, a bank of separated parallel plates in said housing connected together electrically to form a cathode, a plurality of wires extending through the spaces between said plates and connected together electrically to form an anode, a support for said cathode bank and said anode wires, insulating blocks between said support and said bank, insulating spacer plates between said support and said wires, means for applying a positive potential to said wires and a ground potential to said cathode bank and means for minimizing electrical leakage across said insulating plates and blocks comprising an intermediate potential connected to said support.

DONALD G. C. HARE.
GERHARD HERZOG.